(12) United States Patent  (10) Patent No.: US 7,837,262 B2
Merensky  (45) Date of Patent: Nov. 23, 2010

(54) SEATING AND LYING ARRANGEMENT

(75) Inventor: Harald Merensky, Hamburg (DE)

(73) Assignee: Lufthansa Technik AG, Hamburg (DE)

( * ) Notice: Subject to any disclaimer, the term of this patent is extended or adjusted under 35 U.S.C. 154(b) by 48 days.

(21) Appl. No.: 12/065,071

(22) PCT Filed: Aug. 18, 2006

(86) PCT No.: PCT/EP2006/008173

§ 371 (c)(1),
(2), (4) Date: Feb. 27, 2008

(87) PCT Pub. No.: WO2007/025655

PCT Pub. Date: Mar. 8, 2007

(65) Prior Publication Data

US 2008/0185887 A1  Aug. 7, 2008

(30) Foreign Application Priority Data

Aug. 31, 2005 (EP) .................. 05018937

(51) Int. Cl.
  *A47C 7/62* (2006.01)
(52) U.S. Cl. .................. 297/217.3; 297/256; 5/118
(58) Field of Classification Search .................. 5/118, 5/2.1; 297/354.13, 217.3, 256; 244/118.5
See application file for complete search history.

(56) References Cited

U.S. PATENT DOCUMENTS 2,564,512 A * 8/1951 Specht .................. 5/2.1
2,995,095 A   8/1961 Murphy
3,675,965 A   7/1972 Burdett
5,259,575 A  11/1993 Cabrera
6,845,531 B2 * 1/2005 Kjellberg et al. .................. 5/118

(Continued)

FOREIGN PATENT DOCUMENTS

CH  248372  4/1947
DE  3219637 A1 * 12/1983

(Continued)

OTHER PUBLICATIONS

EP Search Report, mailed on Feb. 24, 2006, directed to counterpart EP Application No. EP 05 01 8937. 7 pages.

(Continued)

*Primary Examiner*—Robert G Santos
*Assistant Examiner*—Brittany M Wilson
(74) *Attorney, Agent, or Firm*—Morrison & Foerster LLP

(57) ABSTRACT

A seating and lying arrangement for the passenger region of aircraft. The arrangement can be brought into a seating state and a lying state. In the seating state, the arrangement has a seating surface and a backrest. In the lying state, the arrangement provides a lying surface. The arrangement comprises a seating device and a lying device which is separate therefrom. In the seating state, the lying device is arranged next to the seating device. In the lying state, the lying device is arranged above the seating device. A change can be made between the seating state and the lying state of the arrangement.

22 Claims, 9 Drawing Sheets

U.S. PATENT DOCUMENTS

| | | | |
|---|---|---|---|
| 7,021,701 B1* | 4/2006 | Hoernle et al. | 296/190.02 |
| 2003/0057323 A1* | 3/2003 | Keogh | 244/118.5 |
| 2004/0003463 A1* | 1/2004 | Kjellberg et al. | 5/118 |
| 2005/0040288 A1 | 2/2005 | Keogh | |
| 2005/0067870 A1 | 3/2005 | Rezag et al. | |
| 2007/0170310 A1* | 7/2007 | Bock et al. | 244/118.5 |

FOREIGN PATENT DOCUMENTS

| | | |
|---|---|---|
| EP | 1 172 252 A1 | 1/2002 |
| NL | 8401599 | 12/1985 |
| WO | WO-2005/080196 A1 | 9/2005 |

OTHER PUBLICATIONS

International Search Report, mailed on Dec. 22, 2006, directed to counterpart International Application No. PCT/EP2006/008173. 9 pages.

International Preliminary Report on Patentability, mailed on Apr. 17, 2008, directed to counterpart International Application No. PCT/EP2006/008173; 6 pages.

* cited by examiner

SEATING AND LYING ARRANGEMENT

FIELD AND BACKGROUND OF THE INVENTION

The invention relates to a seating and lying arrangement intended, in particular, for the passenger region of aircraft. The arrangement can be brought into a seating state and a lying state. In the seating state, the arrangement comprises a seating surface and a backrest, in the lying state it has a lying surface.

Especially during long haul flights, passengers have found it agreeable if they can either sit or lie in their seat depending on their own choice. It is known to equip aircraft with combined seating and lying devices for this purpose. In the seating state, the passenger can sit on the seating surface and can lean his back against the backrest. In order to bring the combined device from the seating state into the lying state, the backrest is pivoted into the plane of the seating surface, and therefore an approximately flat lying surface is produced.

A disadvantage of such combined seating and lying devices is that compromises have to be accepted both in the seating state and in the lying state. In order for an approximately flat surface to be produced in the lying state, the seating surface and the backrest cannot be contoured in a manner that would be optimum for comfortable sitting. In the lying state, the lying surface is not wider than the width of the seat and is therefore too narrow for comfortable lying. In addition, the transitions between the parts forming the seating surface and the backrest in the seating state, which transitions also do not completely disappear in the lying state, limit the lying comfort.

SUMMARY OF THE INVENTION

The invention is based on the object of presenting a lying and seating arrangement, in particular for the passenger region of aircraft, which provides both improved seating comfort and improved lying comfort. The object is achieved as broadly disclosed and advantageously in accordance with the detailed embodiments disclosed below.

The arrangement is distinguished according to the invention in that it comprises a seating device and a lying device which is separate therefrom, and in that, in the seating state, the lying device is arranged vertically next to the seating device in a manner folded in the longitudinal direction and, in the lying state, is arranged above the seating device. To change between the seating state and the lying state, the inclination of the backrest of the seating device is changed by pivoting the backrest in relation to the seating surface and the lying device is moved from the position laterally next to the seating device into the position above the seating device. The details up, down, laterally are based on the floor of the cabin.

Since the arrangement comprises a lying device which is separate from the seating device, each of the two devices can be adapted optimally for the particular intended use. The seating device can be contoured for optimum seating comfort. The lying device can be completely flat and at the same time can be designed to be wide enough to allow comfortable lying. Since, in the lying state, the lying device is arranged above the seating device and, in the seating state, is arranged next to the seating device, the space available to the passenger is used well. In the first class of commercial airlines, a customary seat spacing nowadays is around 85" (2.16 m) and the seat width available to a first class passenger, including storage spaces arranged next to the seat (as measured at the height of the cabin floor) is usually approximately 38" (97 cm). In the prior art, a "sleeper seat" which can be adjusted to form a flat bed (with the abovementioned disadvantages) is arranged in this area.

The invention makes it possible in the same area to combine a seat of this type with a separate lying device which uses substantial parts of said area as a lying surface for the passenger. All that needs to be provided are separating devices and screens between the adjacent seats, and therefore, at a seat spacing of 85" (2.16 m), a lying surface with a length of 78" (1.98 m), for example, can be produced. The entire area of the arrangement is preferably not more than 1.4 times, furthermore preferably not more than 1.3 times, furthermore preferably not more than 1.2 times the lying surface of the lying device in the lying state. As a rule, the seat widths of customary first class seats (including armrests) are around approximately 30". This means that a considerable part of the area available next to the seat (width 38") can be used in the seating state as a storage space for the lying device. In the seating state, the lying device is arranged upright next to the seat and can be folded in the longitudinal direction. If, in the lying state, the lying device has a width of 90 cm, it has a height of 45 cm when folded in the longitudinal direction and arranged upright and vertically next to the seat in the seating state. It can therefore be stowed within a console, the upper side or cover of which serves as a storage surface next to the seat for the passenger. The two halves of the lying device can preferably be folded in relation to each other about an axis oriented in the longitudinal direction in the center of the lying device.

In order for the passenger to be able to easily get into the lying device, in the lying state the lying surface is preferably arranged not more than 100 cm, furthermore preferably not more than 80 cm, furthermore preferably not more than 60 cm above the cabin floor.

For good seating comfort, in the seating state the seating device extends to a significantly greater height above the cabin floor than the height in which the lying surface is advantageously arranged. Since, in the lying state, the lying device is arranged above the seating device, during the transition from the seating state into the lying state the seating device has to be changed in such a manner that its highest point is arranged below the level of the lying surface.

It is possible to move the seating device in its entirety vertically for this purpose. However, the height of the seating surface can be maintained if the backrest is pivoted in relation to the seating surface in such a manner that it protrudes by not more than 20 cm, preferably by not more than 10 cm, furthermore preferably by not more than 5 cm above the level of the seating surface. Within the scope of the invention, a head restraint which may be present is also covered by the term backrest. The level of the seating surface is determined by that point of the seating surface which is at the greatest height above the cabin floor.

If the seating device comprises one or more armrests, they are arranged significantly above the seating surface for comfortable sitting in the seating state. In order to keep the overall height of the seating device as small as possible in the lying state, during the change between the seating state and the lying state the armrests can be moved vertically in such a manner that, in the lying state, they protrude by not more than 10 cm, furthermore preferably by not more than 5 cm above the level of the seating surface. They preferably do not exceed the level of the seating surface.

Since the space on board aircraft is limited, it is desirable to accommodate the lying device in as space-saving a manner as possible in the seating state. For this purpose, during a change between the lying state and the seating state, the lying device can be pivoted about an axis oriented in the longitudinal direction of the lying device such that, in the seating state, the lying device is arranged vertically.

Furthermore, during the change between the lying state and the seating state, one part of the lying device can be folded in relation to another part of the lying device along an axis oriented in the longitudinal direction of the lying device, and therefore, in the seating state, the two parts of the lying device are arranged back to back with respect to each other. The lying device which is folded together in this manner only takes up a small height in the seating state.

In addition during the change between the states, the lying device can be moved vertically such that, in the seating state, the lying device does not protrude above the height of the armrest of the seating device. As a result, it is possible, in the seating state, to arrange a storage surface above the lying device, which storage surface is easily accessible to the passenger sitting on the seating device. The storage surface is preferably arranged between 10 cm and 50 cm above the level of the seating surface. Approximately 20 cm are preferred.

So that the passenger can lie comfortably in various fitted states of the arrangement according to the invention, the inclination of the lying device can be adjustable in the longitudinal direction, for example by it being configured such that it can pivot about an axis oriented in the transverse direction of the lying surface. The adjustment range is advantageously at least 3°. As a result, the lying device can be adapted to the fitted state in such a manner that the force acting on the passenger acts perpendicularly to the longitudinal direction of the lying surface. The passenger obtains the sensation of lying on a horizontal surface. The axis which is oriented in the transverse direction of the lying surface is advantageously arranged in the vicinity of the head end of the lying surface. The passenger's head then remains in a constant position relative to the aircraft, even if the inclination of the lying device is changed.

For a better optical impression, in the seating state, the lying device can be arranged within a housing. The housing can comprise the storage surface arranged above the lying device, and also lateral walls. In the seating state, the cover of said housing can be designed as the storage surface and, in the lying state of the arrangement, can be designed as a screen or part of a screen. A light can be arranged on the inside of the cover and, in the state in which the cover is erected as a screen, is a reading or table light.

The arrangement according to the invention preferably has screens on at least three sides. At the head and foot ends of the arrangement, said screens are preferably designed such that they are positionally fixed, i.e. are not adjustable by a passenger within the scope of customary use of the arrangement. Said screens can be formed at half height from the cabin floor, for example can be of a height of approximately 1 m to 1.50 m. They therefore separate the regions of the passengers from one another and provide a certain private sphere.

In the case of a 1-2-1 seating arrangement customary in first class of wide-body aircraft, the arrangements according to the invention arranged at the window can have just two screens at the head and foot ends, since the cabin wall shields them on the third side. In the case of the arrangements according to the invention positioned in each case in pairs next to each other in the center of the aircraft cabin, screens can additionally be provided on a third side, said screens shielding these two arrangements from each other. The cover of the housing for the lying device can be designed as such a screen or as a part thereof.

The fourth side of the arrangement, which side faces the aisle and from which the passenger usually enters the arrangement, can have a screen in parts, in particular in the region of the head end, if appropriate also in the region of the foot end. Said screens can preferably be adjustable. A storage box which can accommodate the passenger's personal items can be arranged at the foot end of the arrangement. In the seating state of the arrangement, the upper side of said storage box can optionally serve as a guest seat.

It is preferable, within the scope of the invention, if said storage box is optionally accessible both from above and from the side. In the lying state, the lying device is arranged above the storage box or, if appropriate, rests thereon. Access from the side makes it possible for the passenger therefore to gain access to the items stored in said box even if the arrangement is in the lying state. The access from the side can be possible, for example, by pulling out a drawer.

Without requiring more space than conventional combined seating and lying devices, the lying surface, which is flat in the lying state, can have a length of at least 190 cm and a width of at least 90 cm. For comfortable lying, the lying device can comprise a mattress which has a thickness of at least 5 cm, preferably at least 8 cm. The storage surface above the lying device is then of a width such that even relatively large objects can be placed thereon. In order to permit the two parts of the lying device to be folded in relation to each other, the mattress can be divided in the longitudinal direction. Those sides of the two mattress parts at which they butt against each other in the lying state are to be designed in such a manner that the gap between the two parts is as small as possible.

For greater operating convenience, the arrangement can include an electric driving device, with the aid of which the individual steps during a change between lying state and seating state are undertaken automatically.

In the lying state, a reading lamp and a further storage surface can furthermore be arranged at the head end of the lying device. The arrangement can comprise a compartment in which bed linen and similar can be accommodated. This compartment is preferably arranged behind the seating device. In addition, the arrangement can comprise a monitor which is preferably arranged in such a manner that it can readily be seen both from the seating position and from the lying position.

BRIEF DESCRIPTION OF THE DRAWINGS

The invention is described by way of example below using an advantageous embodiment and with reference to the attached drawings, in which.

DETAILED DESCRIPTION OF THE INVENTION

Figure 1:
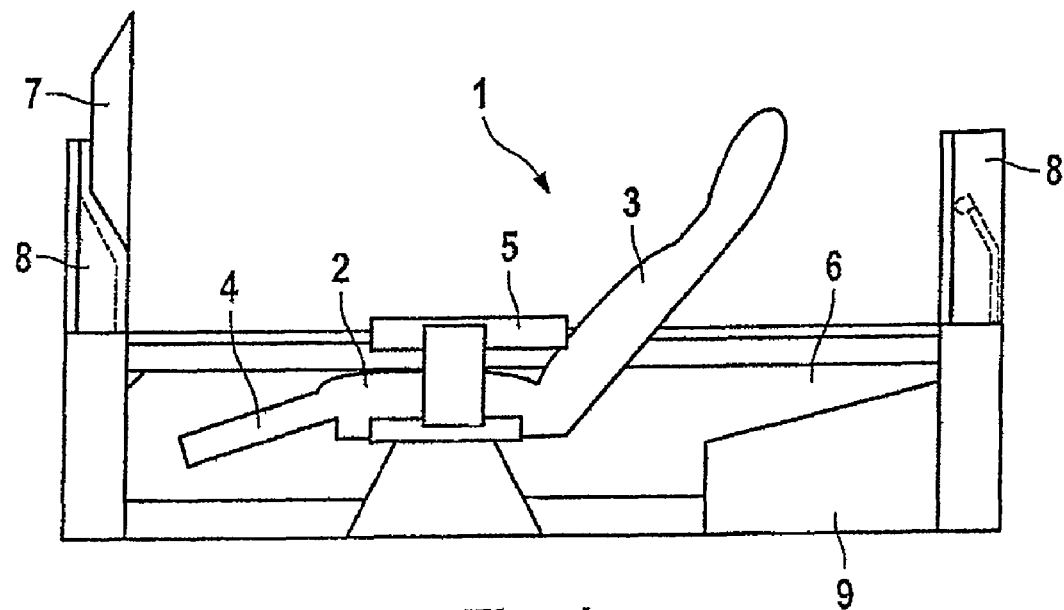
FIG. 1: shows a side view of the arrangement according to the invention in the seating state.

In FIG. 1, the arrangement comprises a seating device in the form of a customary aircraft seat 1. The seat 1 comprises a seating surface 2, a backrest 3 including a head restraint, a footrest 4 and an armrest 5. The backrest 3 and the footrest 4 are angled in relation to the seating surface 2, and the seat 1 is set to a comfortable seating position. A lying device which is not visible in FIG. 1 is stowed in a housing 6 next to the seat 1.

A monitor 7 is arranged in front of the seat 1 in the direction in which the passenger looks. View-protecting walls 8 are located in front of and behind the seat. A compartment 9 for accommodating bedding and the like is shown on the cabin floor 20 behind the seat.

With the seat 1 set to a comfortable seating position and the lying device stowed in the housing 6, the arrangement is in the seating state.

Figure 2:
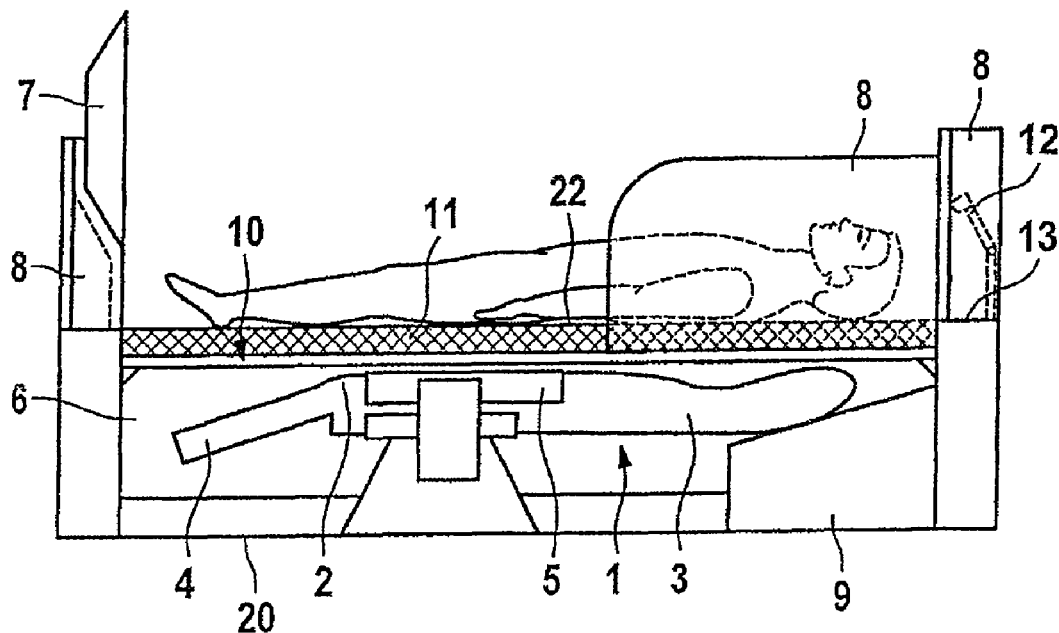
FIG. 2: shows a side view of the arrangement according to the invention in the lying state.

In FIG. 2, the arrangement is in the lying state. The backrest 3 and the armrests 5 of the seat 1 are lowered such that the highest point of the backrest 3 and the highest point of the armrest 5 only protrude slightly above the highest point of the seating surface 2. The lying device 10 which was previously located in the housing 6 and has a mattress 11 is spread out above the seat 1. The bed 10 provides a completely flat lying surface 22 and permits comfortable lying. A reading lamp 12 and a storage compartment 13 are located at the head end of the bed 10. View-protecting walls 8 which are fitted around the bed 10 serve to protect the private sphere of the passenger. The passenger has a good view of the monitor 7 even from the lying position.

As a result of the fact that the seat 1 is set in such a manner that its highest points lie only slightly above the level of the seating surface 2, the bed 10 has such a low height above the cabin floor 20 that it can easily be got into by the passenger.

Figure 3:
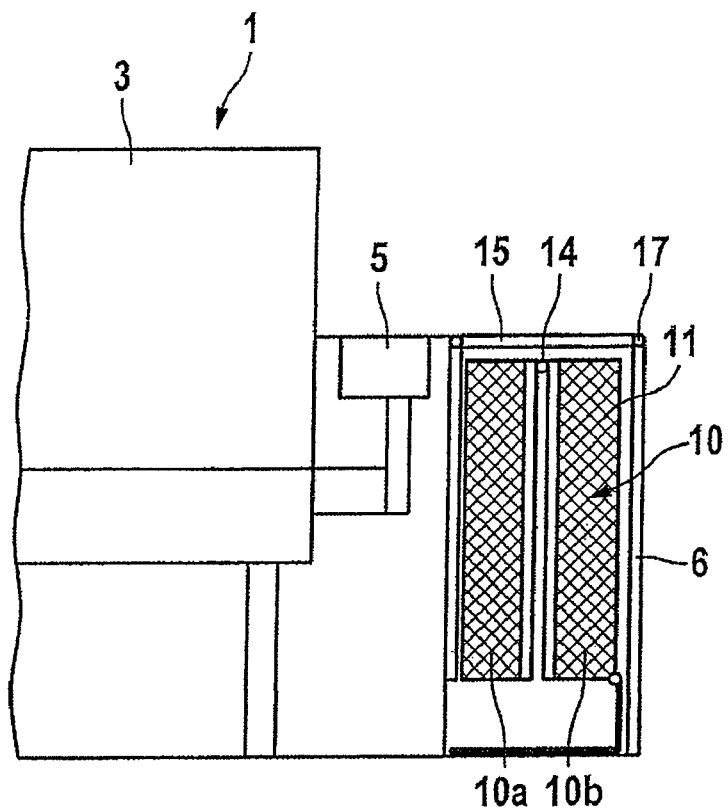
FIG. 3: shows the arrangement according to the invention in the seating state.

In FIG. 3, the arrangement is again illustrated in the seating state. The seat 1 is set upright and the bed 10 is folded together in the housing 6 next to the seat. The bed 10 is folded about an axis 14 oriented in the longitudinal direction of the bed, and therefore two halves 10a, 10b of the bed 10 bear back to back against each other. The mattress 11 is divided in two such that a part of the mattress 11 is connected in each case to each part of the bed 10.

The housing 6 in which the bed 10 is accommodated comprises two side walls and an upper covering which serves as a storage surface 15. The storage surface 15 is arranged at the same height as the armrest 5 of the seat 1, and therefore the passenger sitting on the seat 1 can easily reach the storage surface 15.

Figure 4:
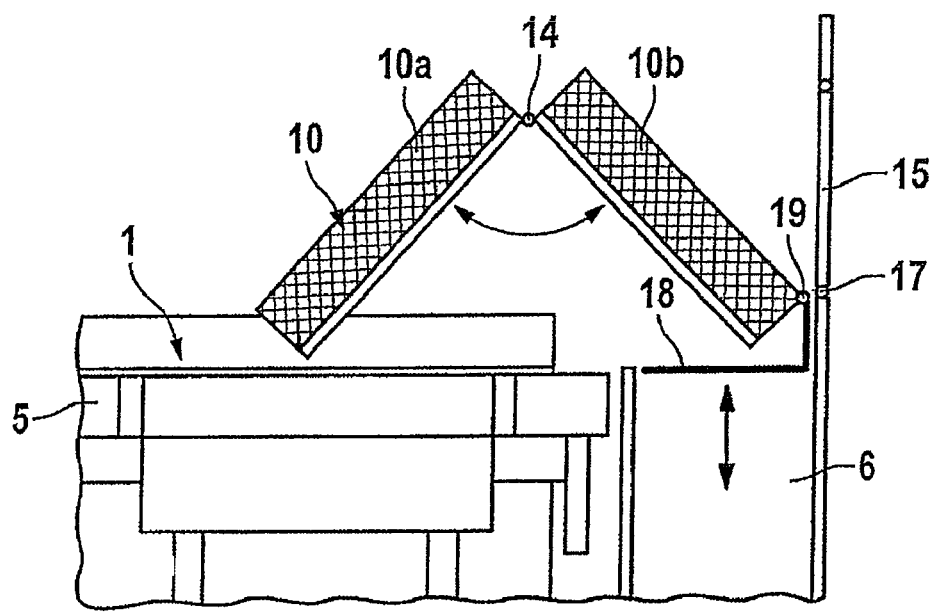
FIG. 4: shows the arrangement according to the invention in an intermediate state between seating state and lying state.

In order to bring the arrangement from the seating state into the lying state, the backrest 3 and the armrests 5 of the seat 1 are first of all lowered such that the seat 1 takes up the state shown in FIG. 4. The storage surface 15 located on top of the housing 6 is pivoted upward about an axis 17 oriented in the longitudinal direction of the bed 10, and therefore the housing 6 is freely accessible from above. The bed 10 is moved upward out of the housing 6 until the lower section of the receptacle 18 of the bed 10 is located level with the upper side of the seat 1. By simultaneous unfolding of the two halves 10a, 10b of the bed 10 about the axis 14 and pivoting of the bed 10 about the axis 19, the bed 10 is spread out above the seat 1 and forms the flat lying surface. In FIG. 4, the bed 10 is shown in an intermediate state during the unfolding operation above the seat 1.

The arrangement is brought from the lying state into the seating state by the reverse sequence of method steps.

Figure 5:
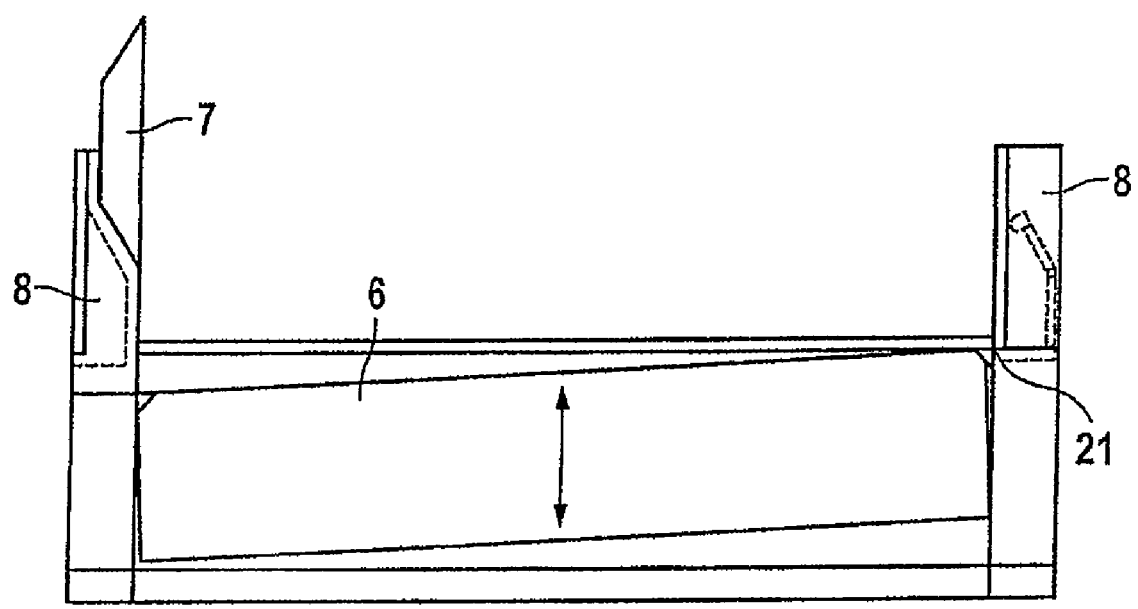
FIG. 5: shows the arrangement according to the invention in side view with an inclined lying device.

According to FIG. 5, the inclination of the lying device can be adjusted. In the lying state, the bed 10 itself and, in the seating state, the storage surface 15 arranged above the lying device can be set in such a manner that said bed/storage surface is situated perpendicularly to the force acting on the passenger. The axis 21 about which the lying device is pivoted is arranged in the vicinity of the head end of the bed 10.

Since the seat 1 and the bed 10 are devices which are separate from each other, they can both be coordinated with the specific lying and seating requirements. The passenger is provided with greater comfort both when lying and when sitting than in the case of a combined seating and lying device. Furthermore, the development costs are reduced in comparison to a combined seating and lying device, since recourse can be made to a standard seat. A further advantage in terms of costs arises from the fact that, when an aircraft is retrofitted with the arrangement according to the invention, the existing seat can frequently continue to be used.

Figure 6:
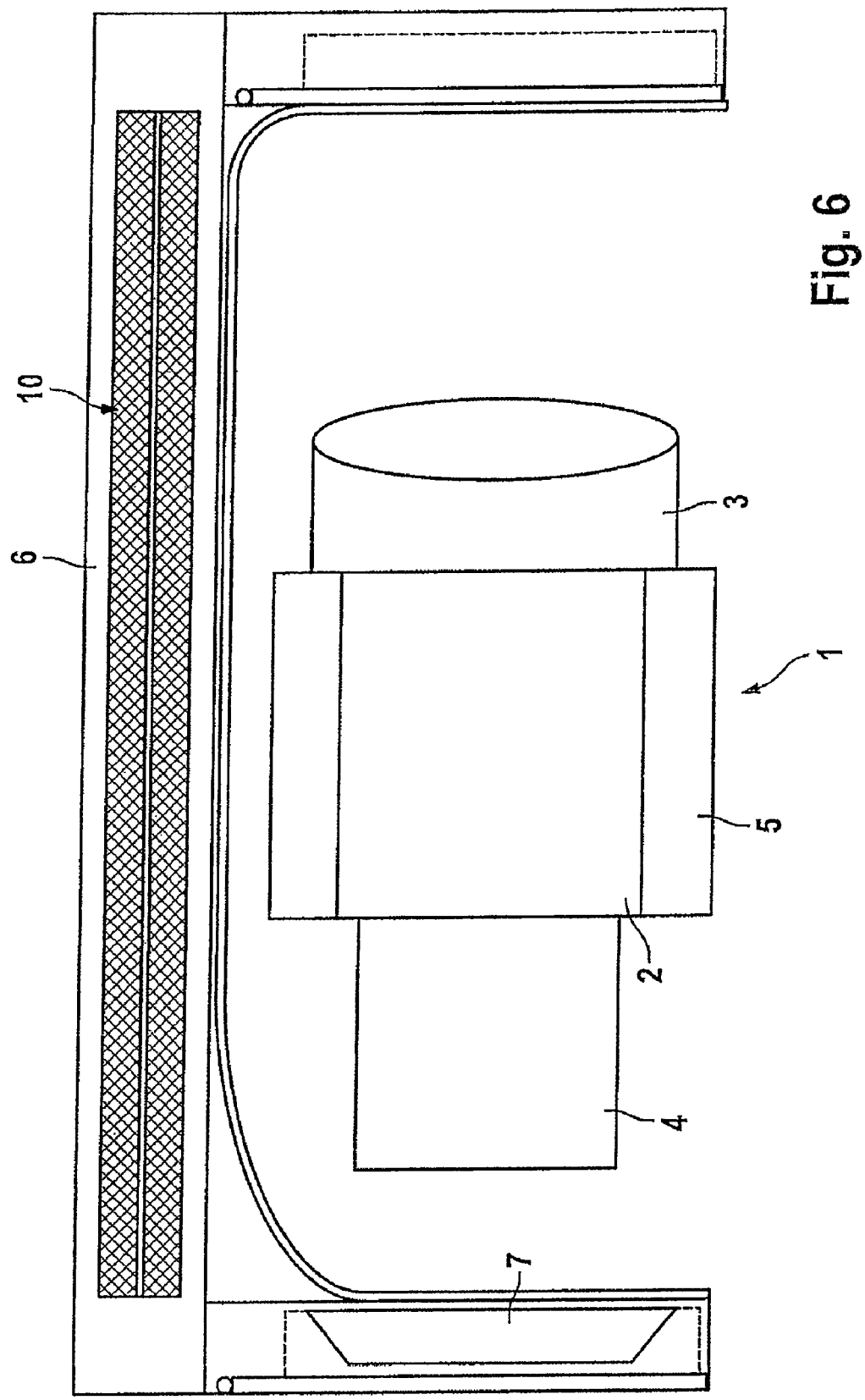
FIG. 6: shows an arrangement according to the invention schematically in a partial sectional view from above.

FIG. 6 shows, in a view from above, the seat 1 with the seating surface 2, the backrest 3, the footrest 4 and the armrests 5. A console or a housing 6 in which the lying device 10 is stored in a manner folded longitudinally and set upright is arranged next to the seat.

Figure 7:
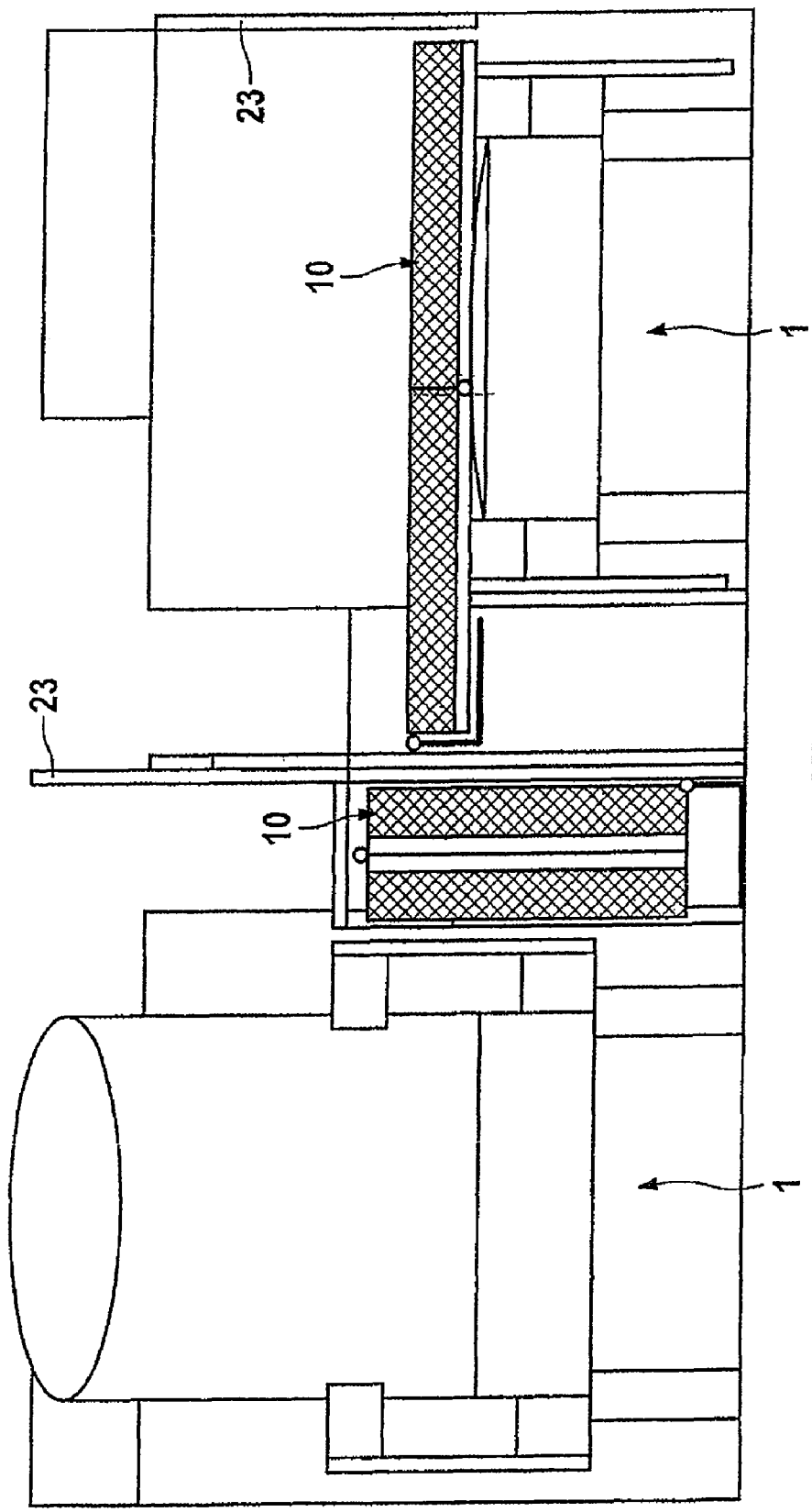
FIG. 7: shows, schematically, two arrangements according to the invention arranged next to each other.

FIG. 7 shows two arrangements according to the invention arranged next to each other. The left arrangement is located in the seating state, and the bed 10 is folded up next to the seat 1. The right arrangement is located in the lying state, and the seat 1 is located flat below the lying device 10. It can be seen that the lying device 10 takes up essentially the entire width of the area available to the passenger, and therefore comfortable lying is possible. The width of the lying device 10 is considerably greater than that of the seating surface 2 of the seat 1. The reference number 23 refers to screens between the seats.

Figure 8:
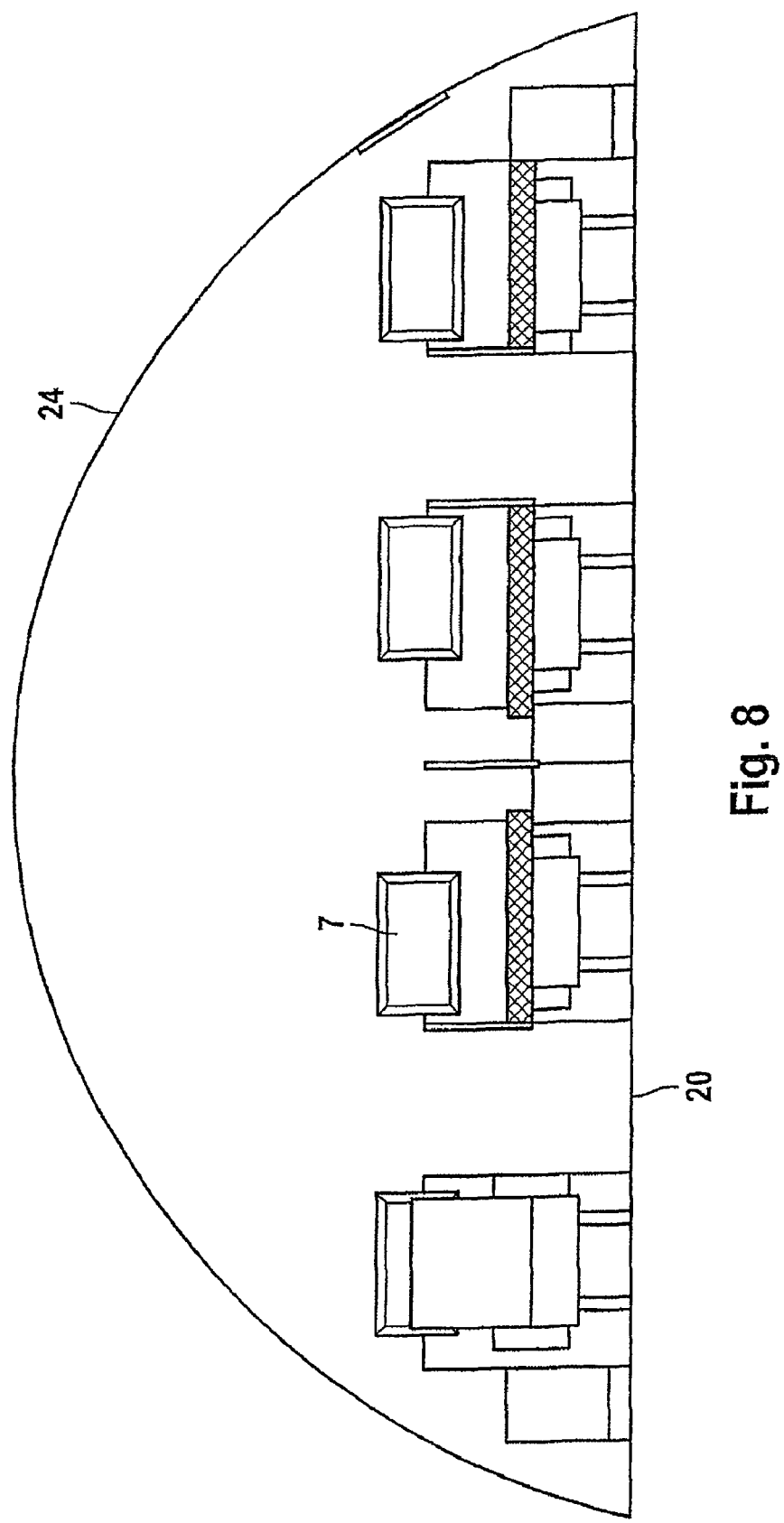
FIG. 8: shows the grouping of arrangements according to the invention as first class seating on the upper deck of an A 380.

FIG. 8 shows, schematically, the grouping of arrangements according to the invention on the upper deck of an Airbus A 380. It can be seen that four arrangements according to the invention can be combined to form a seat configuration 1-2-1 customary in first class. The space required corresponds to a first class configuration of the prior art but the arrangement according to the invention provides significantly greater lying comfort for the passenger. In FIG. 8, the reference number 23 refers to the cabin floor, and the reference number 24 refers to the inside of the aircraft skin.

Figure 9:
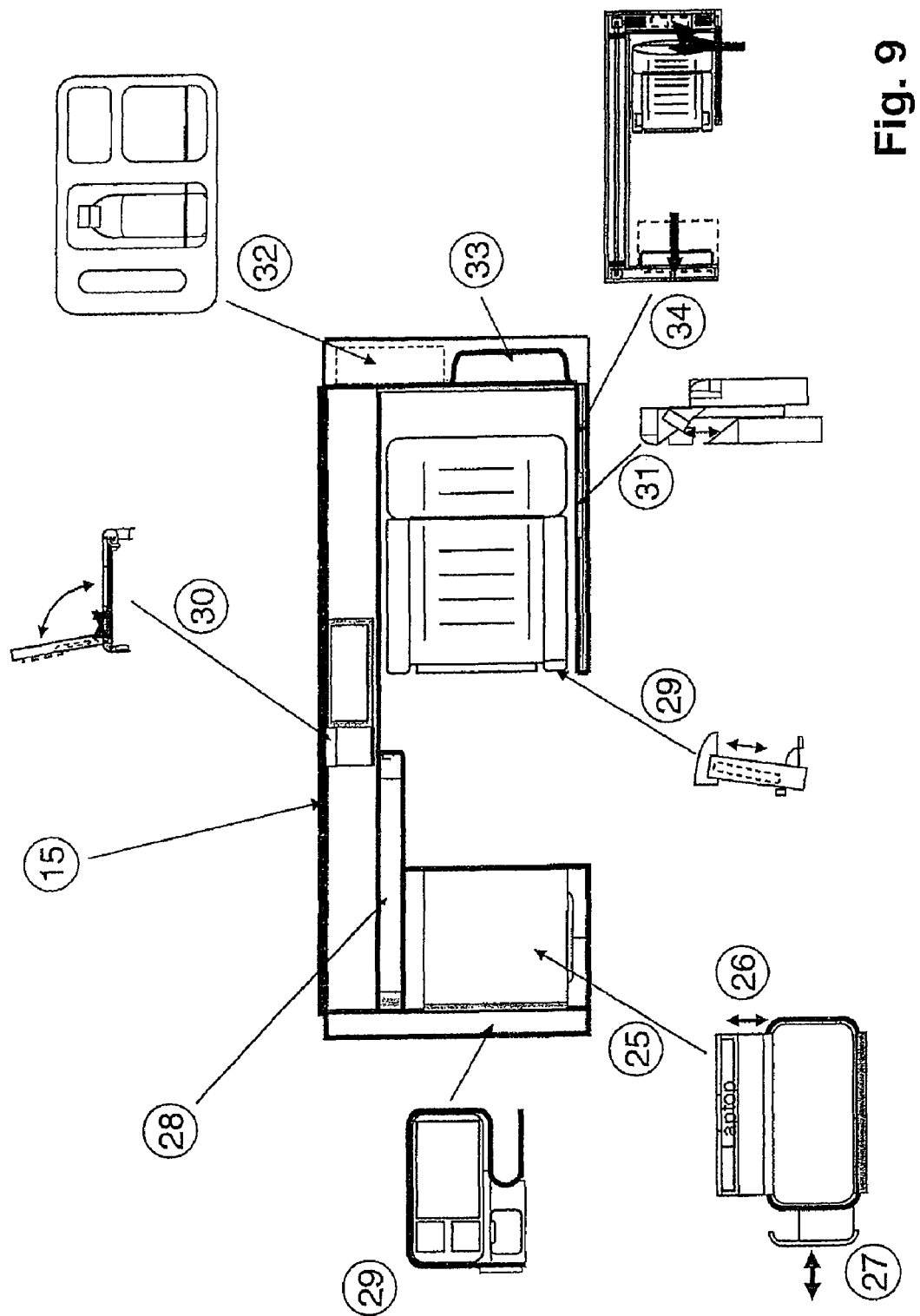
FIG. 9: shows, schematically, a plan view from above of an arrangement according to the invention with a number of functional features being illustrated.

FIG. 9 shows, schematically in a view from above, a further embodiment of the invention with a number of advantageous features. The arrangement has a storage box 25 at the foot end. In the seating state, said storage box is accessible either from above (indicated at 26) or from the side by pulling out a drawer (indicated at 27). A special laptop compartment for accommodating a computer is provided. If the lying device is moved into the lying state, it covers the storage box 25. Accessibility is still ensured by the access from the side 27.

The reference number 28 refers to an adjustable folding table which, in the seating state, can be moved from the stowage state illustrated into the use state.

The reference number 15 refers to the bed box cover which can be used at the same time as a protective screen.

A viewing screen arrangement 29 which has three individual viewing screens is integrated into the foot-side protective screen. The large viewing screen serves primarily for entertainment purposes and the two smaller viewing screens can be used to illustrate personal or flight-related information, such as, for example, connecting flights, connecting gates, arrival information or the like.

A small storage compartment 29 for a music and/or video player, such as, for example, an Ipod® is integrated in an armrest of the seat. Terminals for connecting the Ipod® to audio and/or video playback devices and, if appropriate, a voltage supply are provided.

A table light, shown at 30, is integrated into the bed box cover and, in the use state of the folding table 28, can serve for the illumination thereof.

On that access side of the arrangement which points in the direction of the aisle, there is an electrically upwardly moveable screen, indicated at 31, in the region of the head end. A reading light is integrated into the screen and can be used either during use of the lying device or else in the seating state with the screen 31 raised.

The protective screen which is arranged at the head end has, firstly, a further storage compartment, indicated at 32. It has, secondly, at 33, a step or a clearance which provides additional head room for the passenger in the lying state.

At 34, it is indicated that side walls can be removed rapidly and without a tool in order to obtain access to the mechanical and electronic components of the arrangement according to the invention for maintenance and repair purposes.

Figure 10:
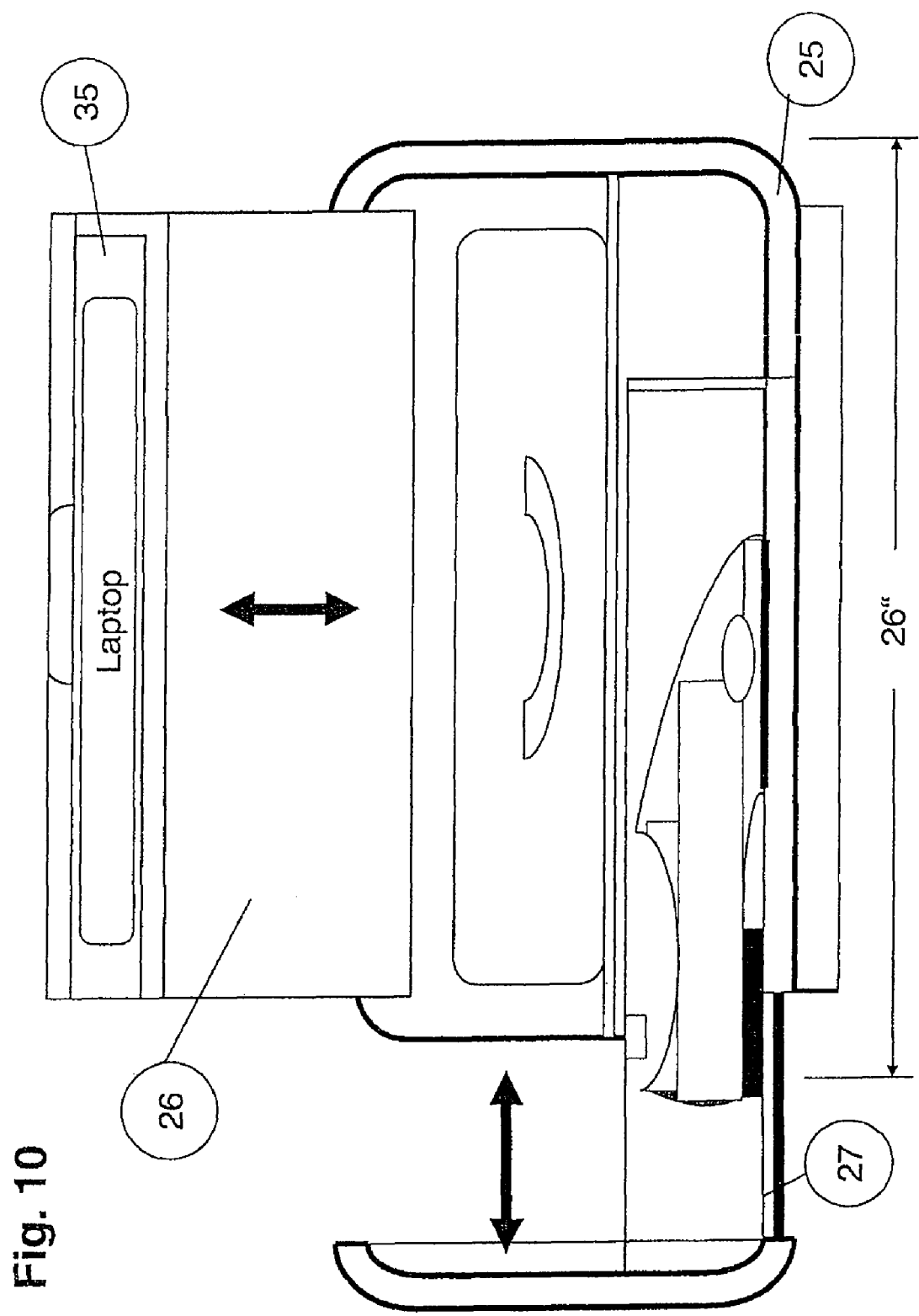
FIG. 10.
Figure 11:
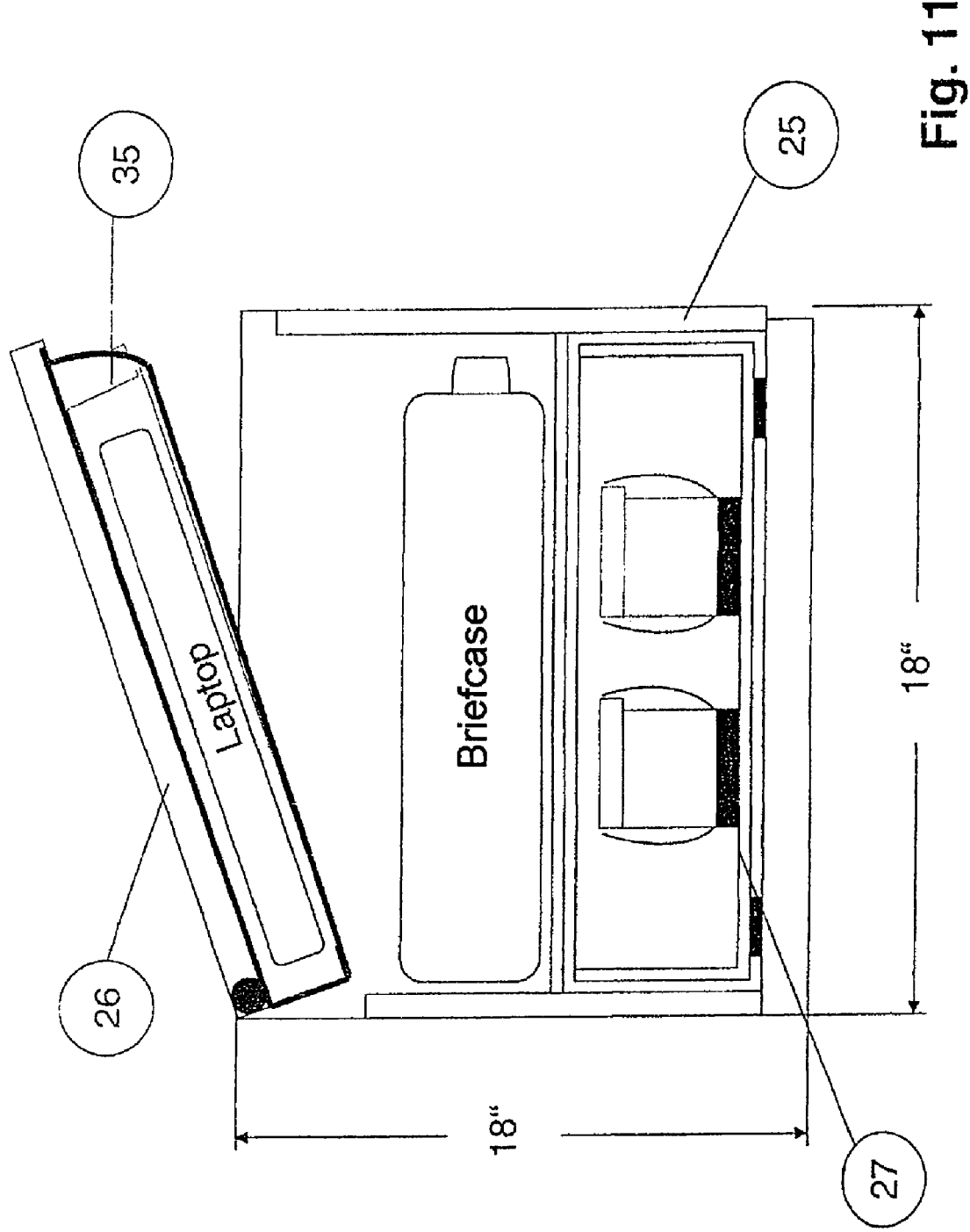
FIG. 11: show, schematically, cross sections through the storage box at the foot end of the arrangement.

FIGS. 10 and 11 show the storage box 25 at the foot end of the arrangements according to the invention in two cross sections. It can be seen in FIG. 10 that the storage box is accessible both from the side by pulling out a drawer opening 27 and also from above by raising a cover 26. A compartment 35 for storing a laptop is additionally integrated in the cover. FIG. 11 shows this storage box schematically in a section through a plane perpendicular to the sectional plane of FIG. 10.

The invention claimed is:

1. A seating and lying arrangement, for a passenger section of an aircraft, which can be brought into a seating state and a lying state, wherein, in the seating state, the arrangement has a seating surface and a backrest and, in the lying state, has a lying surface, comprising:
a seating device including the seating surface and the backrest, and
a lying device which is separate from the seating device, wherein
in the seating state, the lying device is arranged vertically next to the seating device in a manner folded about an axis oriented in the longitudinal direction of the lying device and,
in the lying state, the backrest of the seating device is arranged in a reclined position and the lying device is arranged above and spread out over the entire seating surface and backrest of the seating device.

2. The arrangement as claimed in claim 1, wherein, in the seating state, the lying device is arranged within a housing.

3. The arrangement as claimed in claim 1 or 2, further comprising, in the seating state, a storage surface above the lying device, which is arranged vertically and is folded about the axis oriented in the longitudinal direction, and wherein the storage surface is arranged between 10 cm and 50 cm above the level of the seating surface.

4. The arrangement as claimed in claim 3, wherein the storage surface is arranged on the upper side of the housing.

5. The arrangement as claimed in claim 2, wherein the housing has a cover which, in the lying state of the arrangement, can be erected essentially vertically as a screen.

6. The arrangement as claimed in claim 5, wherein a light is arranged on the inside of the cover.

7. The arrangement as claimed in claim 1, 2, 5 or 6, including screens on at least two sides.

8. The arrangement as claimed in claim 7, wherein the screens are fixed to the head and foot ends of the arrangement.

9. The arrangement as claimed in claim 7, wherein, in the erected state, the cover of the housing is a screen or part of a screen.

10. The arrangement as claimed in claim 1, 2, 5 or 6, including a storage box at the foot end.

11. The arrangement as claimed in claim 10, wherein the storage box is accessible from above and from the side.

12. The arrangement as claimed in claim 10, wherein, in the lying state, the lying device is located above the storage box.

13. The arrangement as claimed in claim 1, 2, 5 or 6 having an area not more than 1.4 times that of the lying surface of the lying device.

14. The arrangement as claimed in claim 1, 2, 5 or 6, wherein, in the lying state, the lying surface is arranged not more than 100 cm above the cabin floor.

15. The arrangement as claimed in claim 1, 2, 5 or 6, wherein, in the lying state, the backrest of the seating device protrudes by not more than 20 cm above the level of the seating surface.

16. The arrangement as claimed in claim 1, 2, 5 or 6, wherein the seating device comprises an armrest, and wherein, in the lying state, the armrest protrudes by not more than 10 cm above the level of the seating surface.

17. The arrangement as claimed in claim 1, 2, 5 or 6, wherein, in the lying state, the lying surface is flat and has a length of at least 190 cm and a width of at least 70 cm.

18. The arrangement as claimed in claim 1, 2, 5 or 6, wherein the lying device comprises a mattress, and wherein the mattress has a thickness of at least 5 cm.

19. The arrangement as claimed in claim 18, wherein the mattress is divided about the axis oriented in the longitudinal direction of the lying device.

20. The arrangement as claimed in claim 1, 2, 5 or 6, including, in the seating state, a storage surface above the lying device, which is arranged vertically and is folded about the axis oriented in the longitudinal direction, and wherein the storage surface is arranged between 10 cm and 50 cm above the level of the seating surface.

21. The arrangement as claimed in claim 1, 2, 5 or 6, wherein the inclination of the lying device is adjustable in the longitudinal direction about an axis oriented in the transverse direction of the lying device.

22. The arrangement as claimed in claim 1, 2, 5 or 6, including an electric driving device for changing between the seating state and the lying state.

* * * * *